E. ANDERSON.
SECURING MEANS FOR A REMOVABLE PULLEY HOUSING.
APPLICATION FILED JAN. 31, 1914. RENEWED APR. 23, 1915.
1,142,870.
Patented June 15, 1915.
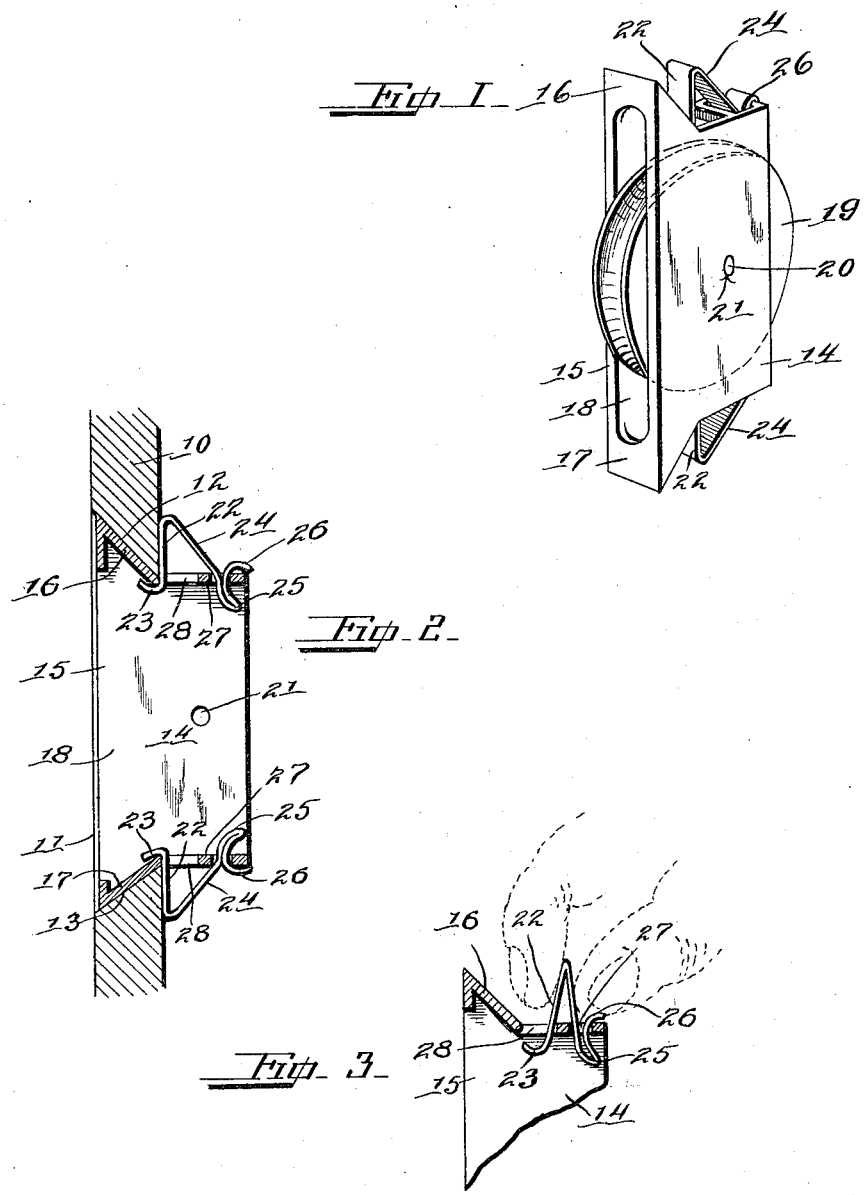
Witnesses
E. S. Hall.
Ross J. Woodward.
Inventor
Edward Anderson
By
his Attorney
THE NORRIS PETERS CO., PHOTO-LITHO., WASHINGTON, D. C.

ved in a patent document.

UNITED STATES PATENT OFFICE.

EDWARD ANDERSON, OF ST. PAUL, MINNESOTA, ASSIGNOR OF ONE-HALF TO A. HERMAN HAUSSON, OF ST. PAUL, MINNESOTA.

SECURING MEANS FOR A REMOVABLE PULLEY-HOUSING.

1,142,870.

Specification of Letters Patent.

Patented June 15, 1915.

Application filed January 31, 1914, Serial No. 815,844. Renewed April 23, 1915. Serial No. 23,519.

*To all whom it may concern:*

Be it known that I, EDWARD ANDERSON, a citizen of the United States, residing at St. Paul, in the county of Ramsey and State of Minnesota, have invented certain new and useful Improvements in Securing Means for a Removable Pulley-Housing, of which the following is a specification.

This invention relates to an improved pulley housing, and the principal object of the invention is to provide improved means for removably securing the pulley housing in the stile of a window frame.

Another object of the invention is to so construct the securing means that it may be easily released and permit the pulley housing to be removed.

Another object of the invention is to so construct the pulley housing that when in place it will be securely held and prevented from having any movement which would cause rattling.

This invention is illustrated in the accompanying drawings wherein—

Figure 1 is a perspective view of the pulley housing; Fig. 2 is a view showing the pulley housing mounted in the stile, the pulley housing being shown in section and the pulley wheel being removed; Fig. 3 is a fragmentary view of the pulley housing showing the manner of inserting and removing the fastener.

The stile 10 is provided with an opening 11, the top and bottom 12 and 13 of which converge as shown in Fig. 2 so that the inward movement of the pulley housing will be limited.

The pulley housing 14 is provided with an enlarged head 15 at its outer end, the upper and lower ends 16 and 17 of which extend in converging relation from the top portion 14 and form abutment shoulders which engage the top and bottom of the opening 11 and limit the inward movement of the pulley housing. This pulley housing is provided with a longitudinally-extending slot which forms a chamber 18 in which the pulley wheel 19 is pivotally mounted by means of a pin 20 which passes through openings 21 formed in the body portion of the pulley housing.

In order to removably hold the pulley housing in the position shown in Fig. 2 there has been provided fastening means which are formed from resilient metal. Each of these securing devices is formed from a strip of resilient sheet metal which is bent adjacent one end to form the arm 22, the front end of which is formed into a cover 23. The central portion of the strip forms a diagonally-extending arm 24 and the opposite end portion of the strip is bent back upon itself to form the curved bight 25 and curved lip 26.

In the operation the pulley housing is passed through the opening 11 in which the head 15 engages the upper and lower ends of the opening and prevents further inward movement of the housing. The securing clips are then put in place by engaging the arms 22 and 24 with the fingers as shown in Fig. 3 and passing the bight 25 through the opening 27 and the hook 23 through the opening 28. The clip is then released and will expand to the position shown in Fig. 2 so that the hook 23 engages the head of the housing and the arm 22 fits flat against the inner face of the stile 10. The housing will now be securely held in place and can not work loose or vibrate in the opening 11 to cause a rattling noise. If it is desired to remove the pulley housing, it is simply necessary to place the end of a tool, such as a screwdriver under the hook 23 and move the hook toward the arm 24 to such an extent that it may be passed through the opening 28. After both of the clips have been released in the manner described, the pulley housing may be easily withdrawn.

I have thus provided a pulley housing which is removably mounted in the stile of a window frame and which is removably held in place by improved clips so constructed that they will securely but releasably hold the pulley housing in place.

What is claimed is:

1. A frame including a stile provided with an opening having inwardly converging upper and lower ends, a pulley housing extending through the opening of said stile and provided with an enlarged outer end portion forming a head provided with diverging upper and lower ends constituting an abutment shoulder for engaging the upper and lower ends of said opening, and resilient means carried by said housing and engaging the inner face of said stile for releasably holding said pulley housing in place.

2. A device of the character described comprising a support provided with an opening, a pulley housing extending through said opening and provided with an enlarged outer end portion limiting its inward movement, the upper and lower end portions of said housing being provided with openings, and resilient securing means engaging the inner face of said stile and provided with a hooked-shaped brace extending through the openings of said pulley housing whereby said clip will be releasably connected with said pulley housing and releasably hold said pulley housing in the opening of said stile.

3. A pulley housing provided with openings in its upper and lower ends, securing clips for releasably holding said pulley housing in an opening formed in a support, each of said clips being formed from a strip of resilient metal bent adjacent one end to form a hook, the intermediate portion of said strip forming a second arm extending at an incline from said first mentioned arm, and the opposite end portion of said strip being bent back upon itself to form a curved bight and being then bent to form a curved lip extending from the inner end of the bight, the bight extending through one of the openings in one end of said pulley housing with the lip engaging the outer face thereof, and the first-mentioned arm extending through the second opening in the end of said housing with its hook engaging the inner face of the housing to releasably hold said clip in engagement with the housing.

4. A pulley housing provided with openings in its upper and lower ends, and resilient clips for holding said pulley housing in place, each of said clips including a pair of arms extending in diverging relation, one of said arms extending through one of the openings in one end of said housing and bent to form a hook engaging the inner face of the housing and the other of said arms having its free end portion bent back upon itself to form a bight extending through a second opening formed in the end of the housing and being then bent to form a lip extending from the bight and engaging the outer face of said housing.

5. A support provided with an opening, a pulley housing extending through the opening of said support and having the upper and lower ends of its inner end portions provided with openings, and resilient securing clips carried by said housing for releasably holding said housing in place, each of said clips including a pair of arms, one of said arms extending in contacting relation to the inner face of said support and passing through one of the openings in one end of said housing with its inner end portion formed into a hook engaging the inner face of said housing and the other of said arms extending from said first-mentioned arm at an incline thereto to brace the same and having its free end portion bent to form a bight extending through a second opening formed in the end of said housing and being then bent to form a lip engaging the outer face of said housing.

6. A device of the character described comprising a support provided with an opening, a pulley housing extending through said opening and having one end portion limiting the movement through the opening in one direction, and resilient securing means for said pulley housing including a pair of arms having their end portions removably connected with said pulley housing, one of said arms engaging the inner face of said support to prevent said pulley housing from moving out of said opening when said securing device is in place.

7. A device of the character described comprising a support, provided with an opening, a pulley housing extending through said opening, and resilient means releasably carried by said pulley housing engaging said support to releasably hold said pulley housing in place.

In testimony whereof I affix my signature in presence of two witnesses.

EDWARD ANDERSON.

Witnesses:
JOHN O. OLSON,
JOHN G. STROMGREN.

Copies of this patent may be obtained for five cents each, by addressing the "Commissioner of Patents, Washington, D. C."